US010006829B2

(12) United States Patent
Tochigi et al.

(10) Patent No.: US 10,006,829 B2
(45) Date of Patent: Jun. 26, 2018

(54) SEDIMENT STATE ESTIMATING APPARATUS, SEDIMENT STATE ESTIMATING METHOD, AND SEDIMENT STATE ESTIMATING SYSTEM

(71) Applicant: Azbil Corporation, Tokyo (JP)

(72) Inventors: Hidenobu Tochigi, Tokyo (JP); Takuya Ishihara, Tokyo (JP)

(73) Assignee: Azbil Corporation, Tokyo (JP)

( * ) Notice: Subject to any disclaimer, the term of this patent is extended or adjusted under 35 U.S.C. 154(b) by 136 days.

(21) Appl. No.: 15/076,826

(22) Filed: Mar. 22, 2016

(65) Prior Publication Data

US 2016/0282213 A1 Sep. 29, 2016

(30) Foreign Application Priority Data

Mar. 24, 2015 (JP) .................................. 2015-060555

(51) Int. Cl.
*G01L 27/00* (2006.01)
*G01L 9/00* (2006.01)

(52) U.S. Cl.
CPC .......... *G01L 27/002* (2013.01); *G01L 9/0072* (2013.01); *G01L 9/0075* (2013.01); *G01L 27/007* (2013.01)

(58) Field of Classification Search
CPC ....... G01L 7/08; G01L 7/082; G01L 19/0645; G01L 13/025; G01L 9/0051; G01L 27/00
USPC ...................................... 73/1.58, 61.65, 715
See application file for complete search history.

(56) References Cited

U.S. PATENT DOCUMENTS

| 4,877,218 A * | 10/1989 | Kasner ................ F16K 31/1262 137/203 |
| 8,629,682 B2 * | 1/2014 | Garrard ................. G01L 27/007 324/382 |
| 2005/0167371 A1 * | 8/2005 | Perry ................... B01D 25/164 210/777 |
| 2007/0056277 A1 * | 3/2007 | Mizoguchi ............ E02F 9/2207 60/413 |
| 2007/0068266 A1 * | 3/2007 | Fujimori ............. B60C 23/0408 73/724 |

(Continued)

FOREIGN PATENT DOCUMENTS

| JP | 2014-109484 A | 6/2014 |
| JP | 2014-126502 A | 7/2014 |

OTHER PUBLICATIONS

European Patent Office, "Extended European Search Report," issued in European Patent Application No. 16 161 193.4, which is a European counterpart of U.S. Appl. No. 15/076,826, dated Aug. 5, 2016, 8 pages.

(Continued)

*Primary Examiner* — Eric S McCall
*Assistant Examiner* — Mohammed E Keramet-Amircola
(74) *Attorney, Agent, or Firm* — Amster, Rothstein & Ebenstein LLP

(57) ABSTRACT

The state of sediment can be estimated based on an initial power supply frequency at which a diaphragm resonates in an initial state in which sediment is not accumulated and a power supply frequency at which the diaphragm resonates after the sediment is accumulated, the state of the sediment can be estimated even in a stage in which the sediment is slightly accumulated on the diaphragm and a zero-point shift does not occur.

2 Claims, 5 Drawing Sheets

(56) References Cited

U.S. PATENT DOCUMENTS

| | | | | |
|---|---|---|---|---|
| 2009/0095693 A1* | 4/2009 | Perry | .................... | C02F 1/001 |
| | | | | 210/780 |
| 2012/0298561 A1* | 11/2012 | Baskis | .................. | C10G 1/047 |
| | | | | 208/435 |
| 2014/0150559 A1* | 6/2014 | Ishihara | ................ | G01L 9/0075 |
| | | | | 73/718 |
| 2014/0182386 A1* | 7/2014 | Ishihara | ............. | G01L 19/0627 |
| | | | | 73/754 |
| 2015/0040674 A1* | 2/2015 | Ishihara | ............. | G01L 19/0636 |
| | | | | 73/724 |

OTHER PUBLICATIONS

Japanese Application No. 2015-060555, filed Mar. 24, 2015.

\* cited by examiner

T1

| Threshold | Progress | Accumulation Information Item |
|---|---|---|
| thΔ1 | 20% | Se1 |
| thΔ2 | 50% | Se2 |
| thΔ3 | 80% | Se3 |

SEDIMENT STATE ESTIMATING APPARATUS, SEDIMENT STATE ESTIMATING METHOD, AND SEDIMENT STATE ESTIMATING SYSTEM

CROSS-REFERENCE TO RELATED APPLICATION

This application claims the benefit of and priority to Japanese Patent Application No. 2015-060555, filed on Mar. 24, 2015, the entire contents of which are incorporated by reference herein.

TECHNICAL FIELD

The invention relates to a sediment state estimating apparatus, a sediment state estimating method, and a sediment state estimating system, more particularly to a capacitance type pressure sensor detecting a change in a sensor diaphragm bending during reception of the pressure of a measurement target fluid as a change in capacitance.

BACKGROUND ART

Conventionally, there is a well-known capacitance type pressure sensor detecting a change in a sensor diaphragm bending during reception of the pressure of a measurement target fluid as a change in capacitance. For example, a capacitance type pressure sensor is used to measure the pressure of a vacuum state in a thin film forming process in a semiconductor manufacturing apparatus or the like and the capacitance type pressure sensor used to measure the pressure of a vacuum state is referred to as a diaphragm vacuum gauge.

The diaphragm vacuum gauge includes a housing having an inlet portion for a measurement target fluid, a sensor diaphragm (provided in the housing) bending during reception of the pressure of the measurement target fluid introduced through the inlet portion of the housing, a sensor unit detecting a change in the bent sensor diaphragm as a change in capacitance, converting the change in capacitance to a voltage value, and outputting the voltage value, and a sensor case covering the housing accommodating the sensor unit therein (see PTL 1, for example). Here, the sensor diaphragm bends and deforms when the surface thereof receives the pressure of the measurement target fluid introduced through the inlet portion of the housing.

In such a diaphragm vacuum gauge, the same material as in the thin film to be processed, by-product material thereof, and the like are accumulated on the surface of the sensor diaphragm. The material accumulated on the surface of the sensor diaphragm is referred to as sediment. When sediment is accumulated on the surface of the diaphragm, an internal stress such as a compression stress or tensile stress is generated according to the state of the sediment.

The generation of the stress pulls or presses the surface of the sensor diaphragm in contact with the measurement target fluid and the force in the thickness direction of the sensor diaphragm becomes unbalanced. This dents or protrudes the surface of sensor diaphragm close to the measurement target fluid.

When the sensor diaphragm bends due to accumulation of sediment on the sensor diaphragm, even though there is no pressure difference between the surface of the sensor diaphragm close to the measurement target fluid and the surface away from the measurement target fluid, detection is performed as if there were a pressure difference, thereby causing zero-point error. Such phenomenon is referred to as a zero-point shift. Since occurrence of a zero-point shift introduces error in pressure measurement by the diaphragm vacuum gauge, the diaphragm vacuum gauge needs to be replaced (see PTL 2, for example).

PRIOR ART DOCUMENTS

[Patent Documents]
[PTL 1] JP-A-2014-126502
[PTL 2] JP-A-2014-109484

SUMMARY OF THE INVENTION

Problems to be Solved by the Invention

Whether sediment has been accumulated on the surface of the sensor diaphragm close to the measurement target fluid has been determined by disassembling the diaphragm vacuum gauge and checking the surface of the sensor diaphragm or by performing measurement based on a zero-point shift.

However, when accumulation of sediment on the surface of the sensor diaphragm is determined by disassembling and checking the diaphragm vacuum gauge, the time and effort for disassembling are needed. In addition, when accumulation of sediment is determined by disassembling and checking the diaphragm vacuum gauge, the diaphragm vacuum gauge needs to be replaced with a new one regardless of the state of sediment.

On the other hand, when accumulation of sediment on the surface of the sensor diaphragm is automatically determined by a predetermined estimating apparatus based on a zero-point shift, presence or absence of sediment cannot be determined unless a zero-point shift occurs actually.

Since the internal stress is very small in a state in which sediment is slightly accumulated on the surface of the sensor diaphragm, no error is introduced in the measurement of the pressure of the measurement target fluid performed by the diaphragm vacuum gauge. Accordingly, accumulation of sediment on the surface of the sensor diaphragm cannot be determined unless a large amount of the sediment accumulates on the surface to the extent that the diaphragm bends to cause a zero-point shift.

The invention address the above problem with an object of providing a sediment state estimating apparatus, sediment state estimating method, and sediment state estimating system that can estimate the state of sediment accumulated on a diaphragm.

Means for Solving the Problems

To achieve this object, according to the invention, there is provided a sediment state estimating apparatus estimating a state of sediment (PM) accumulated on a diaphragm (32) of a pressure sensor unit (30) including the diaphragm (32), a sensor pedestal (33) disposed facing the diaphragm (32), movable electrodes (32b and 32c) formed on the diaphragm (32), fixed electrodes (33b and 33c) formed on the sensor pedestal (33) facing the movable electrodes (32b, 32c), terminals (35, 36, 41, 45, and 46) applying a voltage of an AC power supply to a gap between the movable electrodes (32b and 32c) and the fixed electrodes (33b and 33c), and an output circuit outputting a signal (Su) matching a capacitance formed by the movable electrodes (32b and 32c) and the fixed electrodes (33b and 33c), the sediment state estimating apparatus including a power supply frequency changing portion (210) changing a power supply frequency of the AC power supply to be applied to the terminals (35, 36, 41, 45, and 46), a detecting portion (220) detecting the power supply frequency (rf2) at which the diaphragm (32) resonates when the power supply frequency of the AC power supply to be applied to the terminals (35, 36, 41, 45, and 46) is changed, an initial state storing portion (230) storing an initial power supply frequency (rf1) at which the diaphragm (32) resonates in an initial state in which the sediment (PM) is not accumulated on the diaphragm (32), and an estimating portion (250) estimating the state of the sediment (PM) accumulated on the diaphragm (32) based on the power supply frequency (rf2) detected by the detecting portion (220) and the initial power supply frequency (rf1) stored in the initial state storing portion (230).

In the invention, the sediment state estimating apparatus (200) further includes an output unit (260) outputting information items (Se1 to Se3) indicating the state of the sediment (PM) to the outside.

In the invention, the estimating portion (250) has a plurality of thresholds (thΔ1 to thΔ3) with which a difference (rfΔ) between the power supply frequency (rf2) and the initial power supply frequency (rf1) is compared and estimates the state of the sediment (PM) divided into a plurality of levels by comparing the difference (rfΔ) with the plurality of thresholds (thΔ1 to thΔ3).

According to the invention, there is provided a sediment state estimating method for estimating a state of sediment (PM) accumulated on a diaphragm (32) of a pressure sensor unit (30) including the diaphragm (32), a sensor pedestal (33) disposed facing the diaphragm (32), movable electrodes (32b and 32c) formed on the diaphragm (32), fixed electrodes (33b and 33c) formed on the sensor pedestal (33) so as to face the movable electrodes (32b, 32c), terminals (35, 36, 41, 45, and 46) applying a voltage of an AC power supply to a gap between the movable electrodes (32b and 32c) and the fixed electrodes (33b and 33c), and an output circuit outputting a signal (Su) matching a capacitance formed by the movable electrodes (32b and 32c) and the fixed electrodes (33b and 33c), the method including a power supply frequency change step of changing a power supply frequency of the AC power supply to be applied to the terminals (35, 36, 41, 45, and 46) using a power supply frequency changing portion (210), a detecting step of detecting the power supply frequency (rf2) at which the diaphragm (32) resonates using a detecting portion (220) when the power supply frequency of the AC power supply to be applied to the terminals (35, 36, 41, 45, and 46) is changed, and an estimating step of estimating the state of the sediment (PM) accumulated on the diaphragm (32) using an estimating portion (250) based on an initial power supply frequency (rf1) stored in an initial state storing portion (230) at which the diaphragm (32) resonates in an initial state in which the sediment (PM) is not accumulated on the diaphragm (32) and a power supply frequency (rf2) detected by the detecting portion (220).

According to the invention, there is provided a sediment state estimating system (1) including a pressure sensor unit (30) including a diaphragm (32), a sensor pedestal (33) disposed facing the diaphragm (32), movable electrodes (32b and 32c) formed on the diaphragm (32), fixed electrodes (33b and 33c) formed on the sensor pedestal (33) so as to face the movable electrodes (32b, 32c), terminals (35, 36, 41, 45, and 46) applying a voltage of an AC power supply to a gap between the movable electrodes (32b and 32c) and the fixed electrodes (33b and 33c), and an output circuit outputting a signal (Su) matching a capacitance formed by the movable electrodes (32b and 32c) and the fixed electrodes (33b and 33c); a power supply frequency changing portion (210) changing a power supply frequency of the AC power supply to be applied to the terminals (35, 36, 41, 45, and 46); a detecting portion (220) detecting a power supply frequency (rf2) at which the diaphragm (32) resonates when the power supply frequency of the AC power supply to be applied to the terminals (35, 36, 41, 45, and 46) is changed, an initial state storing portion (230) storing an initial power supply frequency (rf1) at which the diaphragm (32) resonates in an initial state in which the sediment (PM) is not accumulated on the diaphragm (32); and an estimating portion (250) estimating the state of the sediment (PM) accumulated on the diaphragm (32) based on the power supply frequency (rf2) detected by the detecting portion (220) and the initial power supply frequency (rf1) stored in the initial state storing portion (230).

Advantage of the Invention

Since the state of the sediment (PM) can be estimated based on the initial power supply frequency (rf1) at which the diaphragm (32) resonates in the initial state in which the sediment (PM) is not accumulated and the power supply frequency (rf2) at which the diaphragm (32) resonates after the sediment (PM) is accumulated in the invention, the state of the sediment (PM) can be estimated even in a stage in which the sediment (PM) is slightly accumulated on the diaphragm (32) and a zero-point shift does not occur.

Since the state of the sediment (PM) divided into a plurality of levels can be estimated based on the difference (rfΔ) between the power supply frequency (rf2) and the initial power supply frequency (rf1) and the plurality of thresholds (thΔ1 to thΔ3) according to the invention, the operator can recognize the state of sediment (PM) even in an initial stage.

MODE FOR CARRYING OUT THE INVENTION

First, the principle of the invention will be described. Then, an embodiment of the invention will be described with reference to the drawings.

<Principle>

The invention focuses on a change in the natural frequency of a diaphragm caused by an apparent change in the Young's modulus (longitudinal elastic modulus) of the diaphragm caused depending on the amount of sediment accumulated on the pressure receiving surface of the diaphragm of the pressure sensor unit in a capacitance type pressure sensor used in processes of a semiconductor manufacturing apparatus.

Accordingly, in estimating the state of sediment accumulated on a diaphragm of a pressure sensor unit having the diaphragm, a sensor pedestal disposed facing the diaphragm, a movable electrode formed on the diaphragm, a fixed electrode formed on the sensor pedestal so as to face the movable electrode, a terminal applying the voltage of an AC power supply to the gap between the movable electrode and the fixed electrode, and an output circuit outputting the signal matching the capacitance formed by the movable electrode and the fixed electrode, the invention changes the power supply frequency of the AC power supply to be applied to the terminal, detects the power supply frequency at which the diaphragm resonates when the power supply frequency of the AC power supply to be applied to the terminal is changed, and estimates the state of the sediment accumulated on the diaphragm based on the difference between the initial power supply frequency at which the diaphragm resonates in an initial state in which the sediment is not accumulated on the diaphragm and the detected power supply frequency.

<Entire Structure of Sediment State Estimating System>

Figure 1:
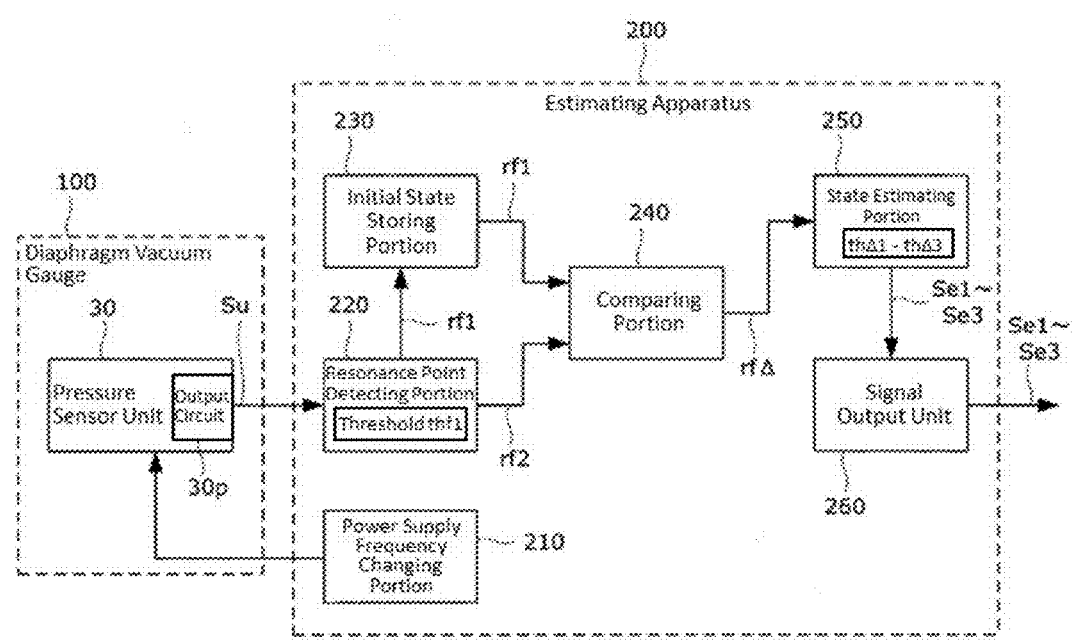
FIG. 1 is block diagram illustrating the entire structure of a sediment state estimating system according to an embodiment.
Figure 2:
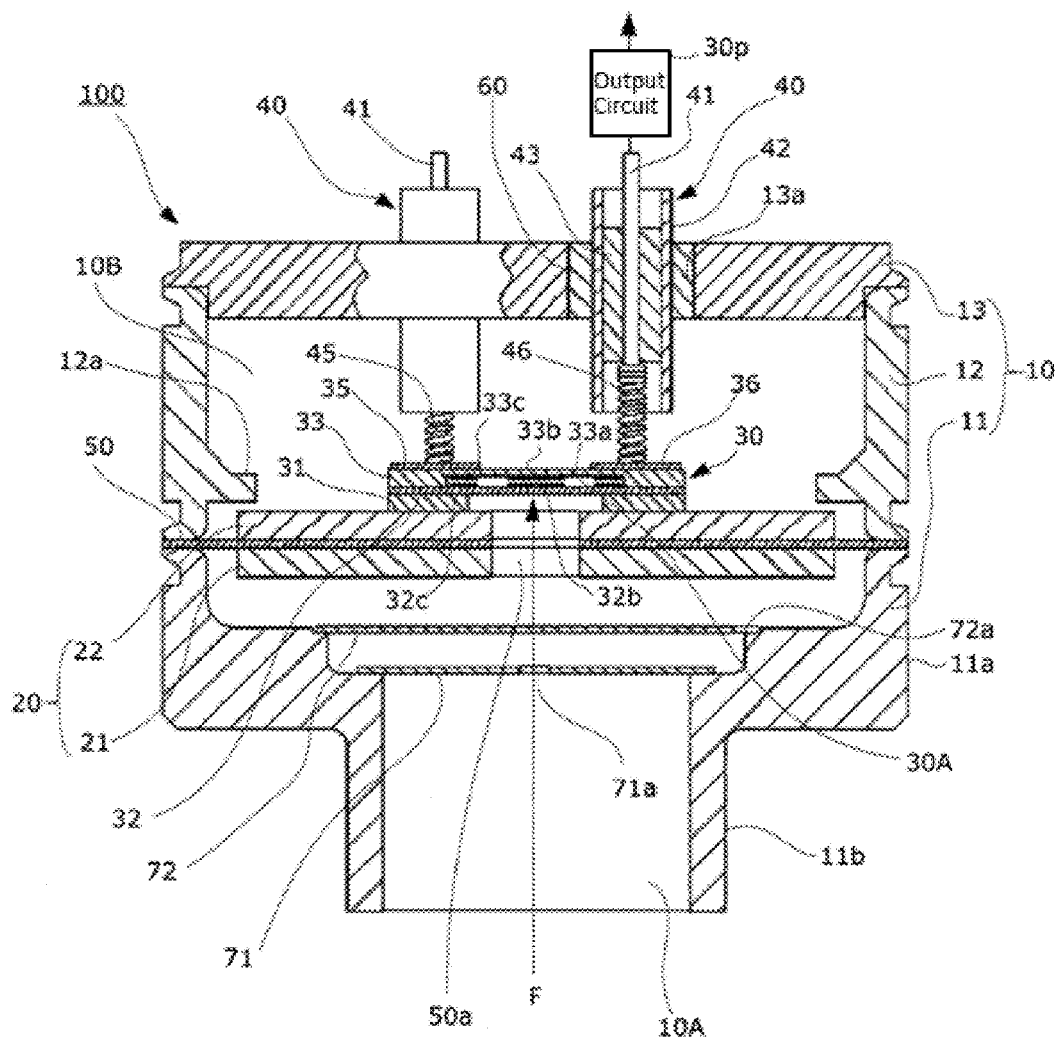
FIG. 2 is a vertical cross sectional view illustrating the main part of a capacitance type pressure sensor (diaphragm vacuum gauge) according to the embodiment.

As illustrated in FIG. 1, a sediment state estimating system 1 includes a diaphragm vacuum gauge 100 and an estimating apparatus 200 estimating the state (progress) of sediment accumulated on the sensor diaphragm (which will be described later) of a pressure sensor unit 30 provided in the diaphragm vacuum gauge 100.

<Structure of Diaphragm Vacuum Gauge>

The diaphragm vacuum gauge 100 includes a housing 10, a pedestal plate 20 accommodated in the housing 10, the pressure sensor unit 30 accommodated in the housing 10 and joined to the upper surface of the pedestal plate 20, and two electrode lead portions 40 directly attached to the housing 10 and conducting the inside and the outside of the housing 10.

The housing 10 includes a lower housing 11, an upper housing 12, and a cover 13. The lower housing 11, the upper housing 12, and the cover 13 are made of corrosive resistant metal called Inconel and they are welded to each other.

The lower housing 11 has a shape formed by combining a large diameter portion 11a and a small diameter portion 11b of cylindrical bodies with different diameters. The large diameter portion 11a has a joint portion for joining to the lower surface of a support diaphragm 50 and the small diameter portion 11b forms an inlet portion 10A into which the measurement target fluid flows.

The upper housing 12 is substantially cylindrical and forms a reference vacuum chamber 10B, which is independent and vacuum, in the housing 10 via the cover 13, the support diaphragm 50, the pedestal plate 20, and the pressure sensor unit 30. The reference vacuum chamber 10B is provided with a gas absorption material called a getter (not illustrated) to ensure the degree of vacuum.

In addition, a stopper 12a projects at the part of the inner peripheral surface of the upper housing 12 close to the support diaphragm 50. The stopper 12a prevents the pedestal plate 20 from being displaced excessively due to an abrupt increase in the pressure of the measurement target fluid.

In addition, the cover 13 is formed by a circular plate and an electrode lead insertion hole 13a is formed in a predetermined position of the cover 13. An electrode lead portion 40 is embedded in the electrode lead insertion hole 13a of the cover 13 via hermetic sealing 60 and the hermetic sealing 60 ensures the sealing of the part in which the electrode lead portion 40 is embedded.

The pedestal plate 20 includes the first plate member 21 and the second plate member 22. The pedestal plate 20 is disposed away from the inner peripheral surface of the housing 10 and supported by the housing 10 only through the support diaphragm 50.

The support diaphragm 50 is formed by an Inconel thin plate having an external shape matching the shape of the housing 10. The support diaphragm 50 is joined by welding or the like with its outer periphery portion (peripheral edge) sandwiched between the edges of the upper housing 11 and the lower housing 12 and the support diaphragm 50 sandwiched between the first plate member 21 and the second plate member 22.

The support diaphragm 50 has a thickness of several tens of micrometers, for example, in the embodiment and is much thinner than plate members 21 and 22. In addition, an inlet hole 50a is provided at the center of the pedestal plate 20 (plate members 21 and 22) and the support diaphragm 50 to introduce the measurement target fluid to the pressure sensor unit 30.

The first plate member 21 and the second plate member 22 are made of sapphire, which is a monocrystal of alumina. The first plate member 21 is joined to the lower surface of the support diaphragm 50 so as to be away from the inner surface of the housing 10 and the second plate member 22 is joined to the upper surface of the support diaphragm 50 so as to be away from the inner surface of the housing 10.

The first plate member 21 and the second plate member 22 are formed much thicker than the support diaphragm 50 as described above and configured so as to sandwich the support diaphragm 50. This prevents the part from warping due to a thermal stress generated by the difference in the thermal expansion coefficient between the support diaphragm 50 and the pedestal plate 20.

In addition, the pressure sensor unit 30, made of sapphire (which is a monocrystal of alumina), having a rectangular shape in plan view is joined to the upper surface of the second plate member 22 via jointing material including alumina.

The pressure sensor unit 30 is formed into a rectangular measuring 1 cm or less per side in plan view and includes a spacer 31 formed by a thin plate having a through hole at the center, a sensor diaphragm 32 formed by silicon joined to the spacer 31, and a sensor pedestal 33 jointed so as to face the sensor diaphragm 32.

The sensor pedestal 33 is formed by a rectangular thin plate as in the spacer 31 and has almost the same size as in the spacer 31. In addition, the sensor pedestal 33 has a recessed portion 33a having a rectangular shape in plan view at the center.

By joining the sensor diaphragm 32 to the sensor pedestal 33, the recessed portion 33a is formed as a capacitance chamber 30A. The same degree of vacuum is kept in the capacitance chamber 30A and the reference vacuum chamber 10B via a communication hole (not illustrated) opened in an appropriate position of the sensor pedestal 33.

The spacer 31, the sensor diaphragm 32, and the sensor pedestal 33 are integrated by a so-called direct joint to form the pressure sensor unit 30. The sensor diaphragm 32, which is a component of the pressure sensor unit 30, is equivalent to the diaphragm in the invention.

In the capacitance chamber 30A of the pressure sensor unit 30, fixed electrodes 33b and 33c made of an electric conductor such as gold or platinum are formed on the bottom surface of the recessed portion 33a of the sensor pedestal 33. Movable electrodes 32b and 32c made of an electric conductor such as gold or platinum are formed on the surface of the sensor diaphragm 32 facing the fixed electrodes 33b and 33c.

In addition, contact pads 35 and 36 made of gold or platinum are formed on the upper surface of the pressure sensor unit 30 and the fixed electrodes 33b and 33c are connected to the movable electrode 32b and 32c by the contact pads 35 and 36 and interconnection (not illustrated).

A total of four electrode lead portions 40 are provided and each of the electrode lead portions 40 has an electrode lead pin 41 and a shield 42 made of metal. The middle part of the electrode lead pin 41 is embedded in the shield 42 via hermetic sealing 43 made of an insulating material such as glass and the hermeticity at both ends of the electrode lead pin 41 is kept.

One end of the electrode lead pin 41 is exposed to the outside of the housing 10. An output circuit 30p is connected to one end of each of the two electrode lead pins 41. The output circuit 30p outputs a sensor output signal Su matching the capacitance of the capacitor formed by the fixed electrodes 33b and 33c and the movable electrodes 32b and 32c when the sensor diaphragm 32 warps and the capacitance changes. In addition, one end of each of the two remaining electrode lead pins 41 is connected to a power supply frequency changing portion 210 of the estimating apparatus 200.

The hermetic sealing 60 is also present between the shield 42 and the cover 13 as described above. In addition, one end of each of contact springs 45 and 46 having electric conductivity is connected to the other ends of the electrode lead pins 41. The other ends of the contact springs 45 and 46 are mechanically and electrically connected to the contact pads 35 and 36.

The contact springs 45 and 46 are flexible enough to prevent the biasing force of contact springs 45 and 46 from affecting the measurement accuracy of the pressure sensor unit 30 even when the support diaphragm 50 displaces slightly due to an abrupt increase in the pressure caused by a sudden flow of the measurement target fluid from the inlet portion 10A.

In the diaphragm vacuum gauge 100, the first baffle 71 made of Inconel and the second baffle 72 made of Inconel are disposed so as to face each other at the exit of the measurement target fluid in the inlet portion 10A between the sensor diaphragm 32 of the pressure sensor unit 30 and the inlet portion 10A.

The first baffle 71 is a disc having an opening 71a as an introducing passage (flow channel) of the measurement target fluid only at the center of the disc surface.

The second baffle 72 is also a disc having an opening 72a as an introducing passage (flow channel) of the measurement target fluid in the periphery of the disc surface. Note that the diameter of the second baffle 72 is slightly larger than that of the first baffle 71.

The first baffle 71 and the second baffle 72 face each other with their disc surfaces disposed orthogonally to a flow direction F of the measurement target fluid. That is, in the diaphragm vacuum gauge 100, the first baffle 71 and the second baffle 72 are provided doubly, the first baffle 71 is disposed on the upstream side in the flow direction F of the measurement target fluid and the second baffle 72 is disposed on the downstream side in the flow direction F of the measurement target fluid.

<Structure of Estimating Apparatus>

The estimating apparatus 200 includes a power supply frequency changing portion 210, a resonance point detecting portion 220, an initial state storing portion 230, a comparing portion 240, a progress estimating portion 250, and a signal output unit 260.

The estimating apparatus 200 is achieved by installing computer programs (software) in a computer (hardware) including a CPU (Central Processing Unit), memory, interface, and the like and the functions of the components of the estimating apparatus 200 are achieved in cooperation between various hardware resources of the computer and computer programs.

The power supply frequency changing portion 210 gradually changes the power supply frequency of a power supply voltage applied to the gap between the fixed electrodes 33b and 33c of the sensor pedestal 33 and the movable electrode 32b and 32c of the sensor diaphragm 32 in the pressure sensor unit 30.

Specifically, the power supply frequency changing portion 210 gradually changes the power supply frequency of the power supply voltage in steps of, for example, several hertz toward a higher frequency band or a lower frequency band from a reference frequency f (Hz) of the power supply voltage when measuring the so-called zero-point in the state in which the sensor diaphragm 32 does not warp using the pressure sensor unit 30.

When changing the power supply frequency of the power supply voltage applied to the gap between the fixed electrodes 33b and 33c of the pressure sensor unit 30 and the movable electrodes 32b and 32c of the sensor diaphragm 32, the resonance point detecting portion 220 detects, as the resonance point, the power supply frequency at which the sensor diaphragm 32 resonates and the internal memory stores a threshold thf1 for determining whether the diaphragm 32 resonates.

When the change amount between the value of the sensor output signal Su obtained in sequence according to changes in the power supply frequency and the previous value is larger than the predetermined threshold thf1, the resonance point detecting portion 220 determines that the sensor diaphragm 32 resonates and outputs, as the resonance point of the sensor diaphragm 32, the power supply frequency at which the sensor output signal Su is obtained.

The initial state storing portion 230 stores the power supply frequency rf1 of the diaphragm 32 in the initial state supplied from the resonance point detecting portion 220. In addition, the initial state storing portion 230 outputs the power supply frequency rf1 at which the sensor diaphragm 32 in the initial state resonates to the comparing portion 240 in response to a request from the comparing portion 240.

When receiving the power supply frequency rf2 at which the sensor diaphragm 32 resonates from the resonance point detecting portion 220 after a lapse of an arbitrary cumulative use time, the comparing portion 240 requests the initial state storing portion 230 to send the power supply frequency rf1 of the diaphragm 32 in the initial state, receives the power supply frequency rf1, and calculates a difference rfΔ between the power supply frequencies rf1 and rf2. The difference rfΔ is the frequency difference between the power supply frequency rf1 and the power supply frequency rf2. The comparing portion 240 outputs the calculated difference rfΔ to the progress estimating portion 250.

Figures 5, 6:
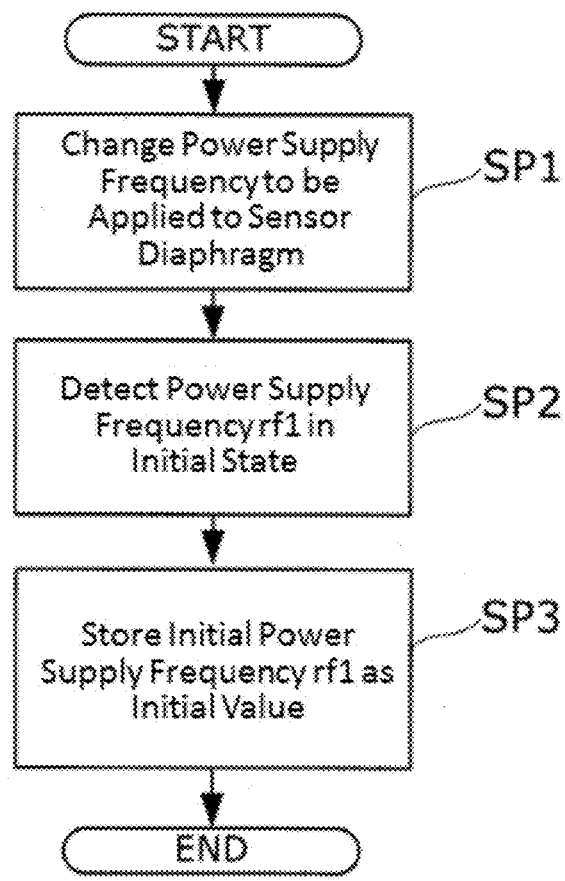
FIG. 5 illustrates a table indicating the correspondence between thresholds and sediment states (progresses) in the embodiment.
FIG. 6 is a flowchart illustrating a processing procedure for storing the initial power supply frequency in the embodiment.

Based on the difference rfΔ supplied from the comparing portion 240, the progress estimating portion 250 estimates the accumulation degree (referred to below as the state) of the sediment PM accumulated on a pressure receiving surface 32a of the sensor diaphragm 32. Specifically, the progress estimating portion 250 stores a table T1 as illustrated in FIG. 5 in the internal memory to estimate the state of the sediment PM.

The table T1 stores correspondence among a plurality of thresholds thΔ1 to thΔ3 (thΔ1<thΔ2<thΔ3) with which the difference rfΔ supplied from the comparing portion 240 is compared, the progresses (20%, 50%, and 80%) indicating the state of the sediment PM corresponding to the thresholds thΔ1 to thΔ3, and information items Se1 to Se3 indicating the progresses. The relationship between the thresholds thΔ1 to thΔ3 and the progresses (20%, 50%, and 80%) of the sediment PM may be obtained and set in advance through experiment or calculation.

Accordingly, the progress estimating portion 250 compares the difference rfΔ with the thresholds thΔ1 to thΔ3, reads the accumulation information items Se1 to Se3 indicating the progress of the sediment PM formed on the sensor diaphragm 32 based on the progress table T1, and outputs the sediment information items Se1 to Se3 to the signal output unit 260.

The signal output unit 260 outputs the accumulation information items Se1 to Se3 supplied from the progress estimating portion 250 to an external notification device (not illustrated). The notification device make some type notification to the user of the diaphragm vacuum gauge 100 based on the accumulation information items Se1 to Se3. The notification device is, for example, warning sound generation means or warning light illumination means. However, the notification device is not limited to these means and may be other means as long as the user can be notified of the estimation results of the progress of the sediment PM on the sensor diaphragm 32 of the pressure sensor unit 30.

<Sediment State Estimation Operation>

Next, the state of accumulation of sediment on the pressure receiving surface of the sensor diaphragm 32 will be described briefly. Then, sediment state estimation operation for estimating the state of sediment accumulated on the pressure receiving surface of the sensor diaphragm 32 of the pressure sensor unit 30 using the estimating apparatus 200 will be described.

Figure 3:
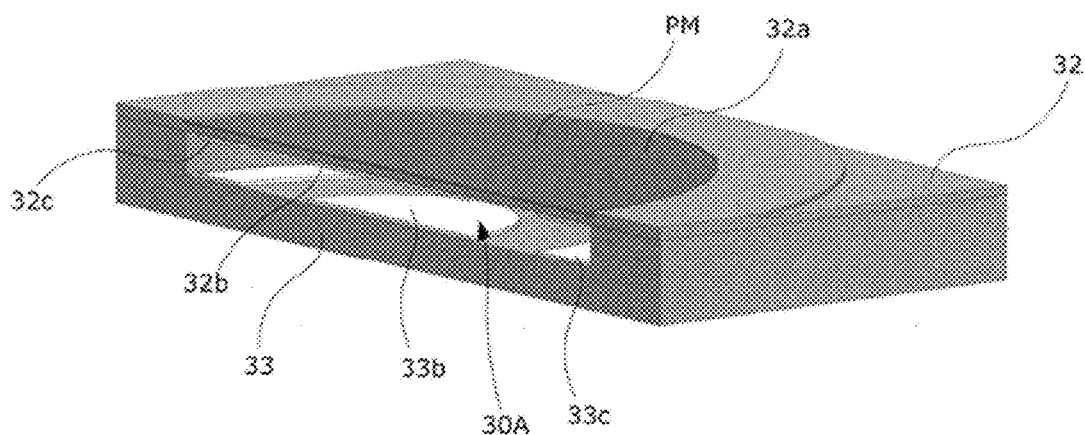
FIG. 3 is a perspective view illustrating the state in which sediment has been accumulated on the pressure receiving surface of the sensor diaphragm of a sensor unit according to the embodiment.
Figure 4:
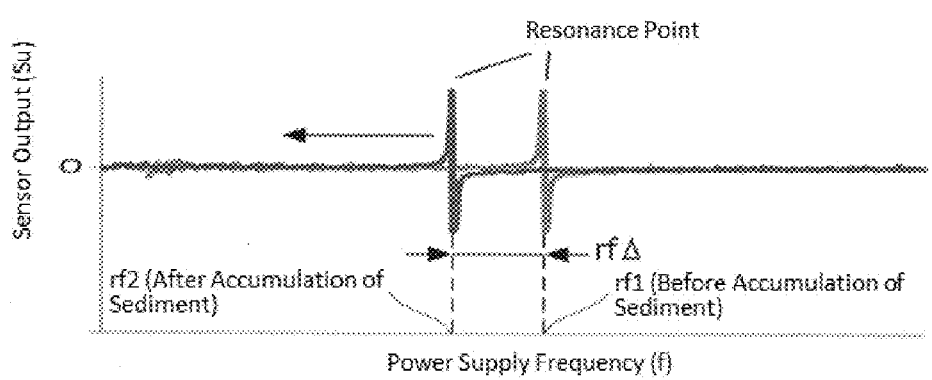
FIG. 4 illustrates the difference between the power supply frequency at which the sensor diaphragm resonates before sediment is accumulated and the power supply frequency at which the sensor diaphragm resonates after sediment is accumulated in the embodiment.

FIG. 3 is an enlarged view illustrating the sensor diaphragm 32 and the sensor pedestal 33 of the pressure sensor unit 30 in FIG. 1 turned upside down. The sediment PM is formed on the pressure receiving surface 32a receiving the pressure of the measurement target fluid on the surface of the diaphragm 32 of the pressure sensor unit 30 since the measurement target fluid is introduced from the inlet portion 10A of the housing 10 via the opening 71a of the first baffle 71, the opening 72a of the second baffle 72, and the inlet hole 50a.

The amount of the sediment PM increases as the time period in which the measurement target fluid is introduced from the inlet hole 50a increases. Since the bending moment increases when the amount of the sediment PM accumulated on the pressure receiving surface 32a of the sensor diaphragm 32 increases, the sensor diaphragm 32 warps. In estimating the state of the sediment PM formed on the pressure receiving surface 32a of the sensor diaphragm 32 using the estimating apparatus 200, descriptions will be given for the initial value storing stage and the sediment state estimation stage.

<Initial Value Storing Stage>

In the initial value storing stage, the power supply frequency rf1 (referred to below as the initial power supply frequency rf1) at which the sensor diaphragm 32 resonates in the initial state before the sediment PM is accumulated is stored in advance.

As illustrated in FIG. 6, the power supply frequency changing portion 210 of the estimating apparatus 200 first applies a power supply voltage to the gap between the movable electrodes 32b and 32c of the sensor diaphragm 32 in the initial state before the sediment PM is accumulated and the fixed electrodes 33b and 33c of the sensor pedestal 33 in the pressure sensor unit 30 and gradually changes the power supply frequency of the power supply voltage from the reference frequency f (Hz) (step SP1).

When the frequency of vibration of the sensor diaphragm 32 matches the natural frequency of the sensor diaphragm 32 due to changes in the power supply frequency of the power supply voltage, the sensor diaphragm 32 resonates.

At this time, the resonance of the sensor diaphragm 32 causes the level of the sensor output signal Su from the output circuit 30p of the pressure sensor unit 30 to increase abruptly. When the change rate of the sensor output signal Su is larger than the threshold thf1, the resonance point detecting portion 220 detects the initial power supply frequency rf1 at which the sensor diaphragm 32 resonates in the initial state before the sediment PM is accumulated (step SP2).

The resonance point detecting portion 220 outputs the initial power supply frequency rf1 of the sensor diaphragm 32 in the initial state before the sediment PM is accumulated to an initial state storing portion 230 and stores the initial power supply frequency rf1 as the initial value in the initial state storing portion 230 (step SP3).

<Sediment State Estimation Stage>

In the sediment state estimation stage, the state (progress) of the sediment PM accumulated on the pressure receiving surface 32a of the sensor diaphragm 32 is estimated at an arbitrary point of time after a lapse of an arbitrary cumulative use time in the diaphragm vacuum gauge 100 in a process of a semiconductor manufacturing apparatus after the above initial value storing stage.

Figure 7:
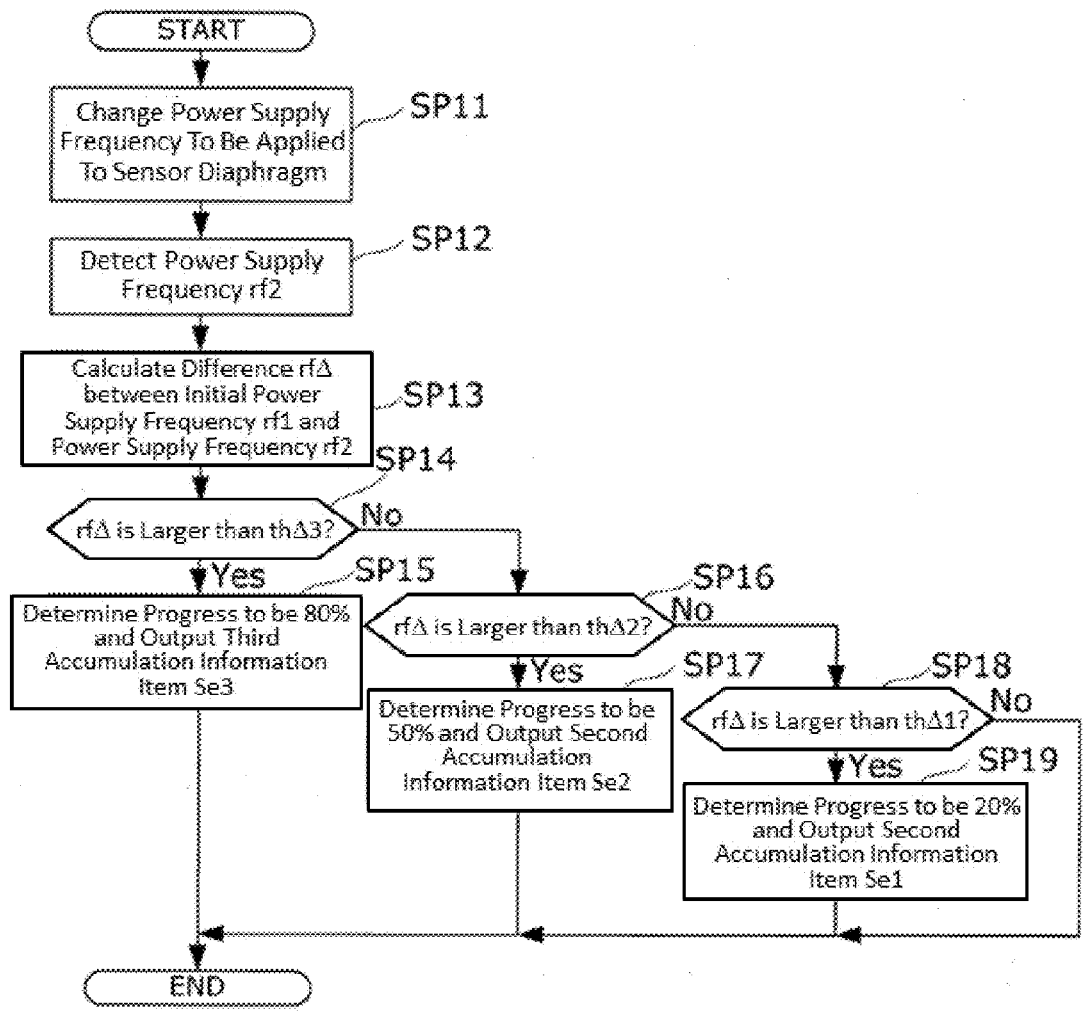
FIG. 7 is a flowchart illustrating a processing procedure for estimating the state of sediment in the embodiment.

As illustrated in FIG. 7, the power supply frequency changing portion 210 gradually changes the power supply frequency of the power supply voltage to be applied to the gap between the movable electrodes 32b and 32c of the sensor diaphragm 32 and the fixed electrodes 33b and 33c of the pressure sensor unit 30 from the reference frequency f (Hz) (step SP11).

Although the sensor diaphragm inherently has a natural frequency, when the sediment PM is formed on the pressure receiving surface 32a in the process of the semiconductor manufacturing apparatus, the apparent Young's modulus changes depending on the amount of the sediment PM, whereby the natural frequency of the sensor diaphragm 32 changes. Once the sediment PM is accumulated, the natural frequency of the sensor diaphragm 32 is shifted to the plus side or the minus side from the natural frequency of the sensor diaphragm 32 in the initial state before the sediment PM is formed. As the amount of the sediment PM accumulated increases, the natural frequency of the sensor diaphragm 32 further deviates from the natural frequency of the sensor diaphragm 32 in the initial state.

When the change amount of the sensor output signal Su due to the sensor diaphragm 32 after the sediment PM is accumulated is larger than the threshold thf1, the resonance point detecting portion 220 detects the power supply frequency rf2 at which the sensor output signal Su is obtained using the same method as in the above initial value storing stage as the second resonance point of the sensor diaphragm 32 after the sediment PM is formed and outputs the power supply frequency rf2 to the comparing portion 240 (step SP12).

The comparing portion 240 calculates the difference rfΔ between the initial power supply frequency rf1 before the sediment PM is accumulated and the power supply frequency rf2 after the sediment PM is formed and outputs the difference rfΔ to the progress estimating portion 250 (step SP13).

When determining that the difference rfΔ is larger than a threshold thΔ3 (Yes in step SP14), the progress estimating portion 250 estimates the progress of the sediment PM formed on the pressure receiving surface 32a of the sensor diaphragm 32 to be 80% and outputs the information item Se3 indicating the estimation result to an external notification device (not illustrated) through the signal output unit 260 (step SP15).

This causes the notification device to output a high-volume warning sound indicating the emergency corresponding to the information item Se3 or turn on a red warning light indicating the emergency to notify the operator that the progress of the sediment PM accumulated on the pressure receiving surface 32a of the sensor diaphragm 32 is 80% and the diaphragm vacuum gauge 100 is just approaching the replacement time.

In contrast, when determining that the difference rfΔ is equal to or less than the threshold thΔ3 (No in step SP14) and determining that the difference rfΔ is larger than the threshold thΔ2 (Yes in step SP16), the progress estimating portion 250 estimates the progress of the sediment PM accumulated on the pressure receiving surface 32a of the sensor diaphragm 32 to be 50% and outputs the information item Se2 indicating the estimation result to the external notification device (not illustrated) through the signal output unit 260 (step SP17).

This causes the notification device to output a middle-volume warning sound corresponding to the information item Se2 or turn on a yellow warning light to notify the operator that the progress of the sediment PM accumulated on the pressure receiving surface 32a of the sensor diaphragm 32 is 50% and the diaphragm vacuum gauge 100 is approaching the replacement time.

In addition, when determining that the difference rfΔ is equal to or less than the threshold thΔ2 (No in step SP16) and determining that the difference rfΔ is larger than the threshold thΔ1 (Yes in step SP18), the progress estimating portion 250 estimates the progress of the sediment PM accumulated on the pressure receiving surface 32a of the sensor diaphragm 32 to be 20% and outputs the information item Se1 indicating the estimation result to the external notification device (not illustrated) through the signal output unit 260 (step SP19).

This causes the notification device to output a low-volume warning sound corresponding to the information item Se1 or turn on a blue warning light to notify the operator that the progress of the sediment PM accumulated on the pressure receiving surface 32a of the sensor diaphragm 32 is 20% and the diaphragm vacuum gauge 100 can be used continuously since the much time remains until the replacement time.

The progress estimating portion 250 can arbitrarily change the values of the thresholds thΔ1 to thΔ3 (thΔ1<thΔ2<thΔ3) stored in the internal memory. Accordingly, by changing the values of the thresholds thΔ1 to thΔ3 according to the use environment of the diaphragm vacuum gauge 100, the estimating apparatus 200 can notify the operator by generating a warning sound or turning on a warning light based on the progress of the sediment PM matching the environment.

<Effects>

Since the natural frequency of the sensor diaphragm 32 changes even when the amount of the sediment PM accumulated on the sensor diaphragm 32 is little in comparison with the sensor diaphragm 32 in the initial state before the sediment PM is accumulated, the estimating apparatus 200 of the sediment state estimating system 1 uses the characteristics of the sensor diaphragm 32.

Since there is the difference rfΔ between the initial power supply frequency rf1 in the initial state before the sediment PM is formed and the power supply frequency rf2 after the sediment PM is formed, the estimating apparatus 200 can estimate the state (progress) of the sediment PM based on the difference rfΔ even when the amount of the sediment PM formed on the pressure receiving surface 32a of the sensor diaphragm 32 is little.

Since the state of the sediment PM formed on the pressure receiving surface 32a of the sensor diaphragm 32 can be estimated even in an early stage, the operator can control the replacement time of the diaphragm vacuum gauge 100 appropriately and optimize the down time of the semiconductor manufacturing apparatus.

In addition, by recognizing the state of the sediment PM formed on the pressure receiving surface 32a of the sensor diaphragm 32 in an early stage, the operator can prevent the pressure measurement from being performed in the state in which the large sediment PM is formed on the sensor diaphragm 32 of the diaphragm vacuum gauge 100 and a zero-point shift has occurred, thereby enabling reduction in the risk of outputting the results of the pressure measurement including error.

Other Embodiments

Although the state (progress) of the sediment PM accumulated on the sensor diaphragm 32 is estimated based on the table T1 in the above embodiment, the invention is not limited to the embodiment and the progress of the sediment PM may be estimated using calculation based on the magnitude of the difference rfΔ.

In addition, although the diaphragm vacuum gauge (capacitance type pressure sensor) 100 is disposed as the target in the above embodiment, the invention is not limited to the embodiment and a semiconductor piezoresistive diffused pressure sensor to which a diaphragm is applied may be disposed as the target.

In addition, although the diaphragm vacuum gauge (capacitance type pressure sensor) 100 is used in a process of a semiconductor manufacturing apparatus in the above embodiment, the invention is not limited to the embodiment and the diaphragm vacuum gauge 100 may be used in various types of other use environments such as in freeze dehydration equipment or vacuum pump evaluating apparatus. In this case, the thresholds thΔ1 to thΔ3 only need to be set according to the use environment.

DESCRIPTION OF REFERENCE NUMERALS AND SIGNS

1: sediment state estimating system, 10: housing, 10A: inlet portion, 10B: reference vacuum chamber, 11: lower housing, 12: upper housing, 13: cover, 20: pedestal plate, 30: pressure sensor unit, 30A: capacitance chamber, 30p: output circuit, 31: spacer, 32: sensor diaphragm (diaphragm), 32a: pressure receiving surface, 32b, 32c: movable electrode, 33: sensor pedestal, 33b, 33c: fixed electrode, 35, 36: contact pad, 40: electrode lead portion, 41: electrode lead pin, 42: shield, 43, 60: hermetic sealing, 45, 46: contact spring, 50: support diaphragm, 71: first baffle, 72: second baffle, 100: diaphragm vacuum gauge, 200: estimating apparatus, 210: power supply frequency changing portion, 220: resonance point detecting portion, 230: initial state storing portion, 240: comparing portion, 250: state estimating portion (estimating portion), 260: signal output unit (output unit), PM: sediment.

The invention claimed is:

1. A sediment accumulation degree estimating apparatus configured to estimate an accumulation degree of sediment accumulated on a diaphragm of a pressure sensor unit, the pressure sensor unit comprising:
the diaphragm,
a sensor pedestal disposed facing the diaphragm,
a movable electrode formed on the diaphragm,
a fixed electrode formed on the sensor pedestal so as to face the movable electrode,
a terminal configured to apply a voltage of an AC power supply to a gap between the movable electrode and the fixed electrode, and
an output circuit configured to output a signal matching a capacitance formed by the movable electrode and the fixed electrode; and
the sediment accumulation degree estimating apparatus comprising:
a power supply frequency changing portion configured to change a power supply frequency of the AC power supply to be applied to the terminal;
a detecting portion configured to detect a power supply frequency at which the diaphragm resonates when the power supply frequency of the AC power supply to be applied to the terminal is changed;
an initial state storing portion configured to store an initial power supply frequency at which the diaphragm resonates in an initial state in which the sediment is not accumulated on the diaphragm;
an estimating portion configured to estimate the accumulation degree of the sediment accumulated on the diaphragm by comparing a difference between the power supply frequency detected by the detecting portion and the initial power supply frequency stored in the initial state storing portion to a plurality of levels, each of the plurality of levels associated with a respective accumulation degree threshold; and
an output unit configured to output an information item to an external device indicating the accumulation degree of the sediment estimated by the estimating portion.

2. A sediment accumulation degree estimating method for estimating an accumulation degree of sediment accumulated on a diaphragm of a pressure sensor unit comprising the diaphragm, a sensor pedestal disposed facing the diaphragm, a movable electrode formed on the diaphragm, a fixed electrode formed on the sensor pedestal so as to face the movable electrode, a terminal configured to apply a voltage of an AC power supply to a gap between the movable electrode and the fixed electrode, and an output circuit outputting a signal matching a capacitance formed by the movable electrode and the fixed electrode, the method comprising:
a power supply frequency change step of changing a power supply frequency of the AC power supply to be applied to the terminal using a power supply frequency changing portion;
a detecting step of detecting a power supply frequency at which the diaphragm resonates using a detecting portion when the power supply frequency of the AC power supply to be applied to the terminal is changed; and
an estimating step of estimating the accumulation degree of the sediment accumulated on the diaphragm using an estimating portion by comparing a difference between an initial power supply frequency stored in an initial state storing portion at which the diaphragm resonates in an initial state in which the sediment is not accumulated on the diaphragm and a power supply frequency detected by the detecting portion to a plurality of levels, each of the plurality of levels associated with a respective accumulation degree threshold; and
an outputting step of outputting, using an output unit, an information item to an external device indicating the accumulation degree of the sediment estimated in the estimating step.

* * * * *